May 14, 1974 G. ZACHARIADES 3,810,816
PROCESS FOR MAKING REINFORCED RESIN LAMINATES
OF UNIFORM THICKNESS
Filed April 6, 1972
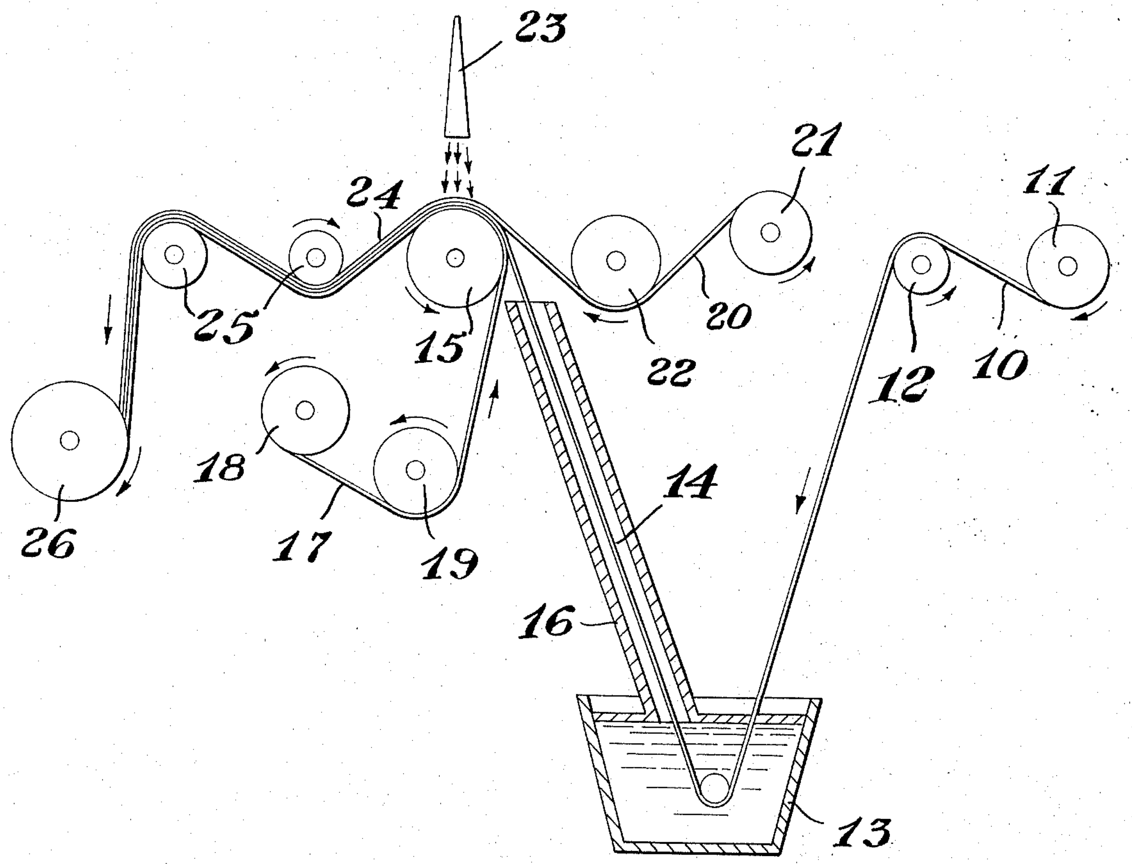

United States Patent Office 3,810,816

Patented May 14, 1974

3,810,816

PROCESS FOR MAKING REINFORCED RESIN LAMINATES OF UNIFORM THICKNESS

George Zachariades, Alvin, Tex., assignor to The Dow Chemical Company, Midland, Mich.

Filed Apr. 6, 1972, Ser. No. 241,698
Int. Cl. B32b *31/28*
U.S. Cl. 161—214 26 Claims

ABSTRACT OF THE DISCLOSURE

A fast, continuous process especially useful for making thin, flexible, electrical grade laminates is disclosed which comprises the steps of impregnating a fibrous substrate with certain polymerizable resin/monomer mixtures, applying sufficient pressure across the lateral width of the impregnated substrate to express entrapped air bubbles therefrom and to uniformly distribute the resin/monomer impregnant, and exposing the substrate in an inert atmosphere to a sufficient amount of ionizing radiation to polymerize the resin monomer mixtures. The laminates may be metal foil clad laminates or unclad.

BACKGROUND OF THE INVENTION

The subject matter of this invention relates to an improved process for continuously making reinforced laminates of uniform thickness. It is especially directed to the preparation of flexible, electrical grade thin laminates where uniformity of thickness is particularly desirable and difficult to obtain. It is further directed to metal foil clad laminates, especially copper clad, for use in making printed circuits.

Thermosettable resins such as epoxy resins have been used to prepare reinforced laminates of all kinds. In general the laminates are prepared by impregnating the reinforcing material, commonly glass fiber, forming the object (sheet, pipe, vessels etc.) and curing by a thermal treatment. What appears to be a straight-forward simple process is attended by numerous process and product difficulties. Among the problems encountered are the time required to cure by thermal means which requires extensive oven facilities, the variations in properties which result due to evaporation of solvents and particularly to loss of monomers and volatile coreactants and the inhibition of cure when copper clad laminates are prepared with polymerizable resins such as unsaturated polyesters wherein the copper interferes with the free radical polymerization of the resin.

The laminates produced also have various deficiencies, especially the flexible electrical grade laminates. The dielectric properties can vary due to non-uniformity and to excessive moisture pick-up. The laminates are not dimensionally stable. Frequently the laminates have pin holes, surface voids and the like. Because of the intended use, i.e. printed circuits, the need for a smooth surface is obvious. It is also necessary that the laminate be as free as possible of imperfections for the best electrical properties. Some attention has been given to adhesively bonding copper foil to a film of polyester (Mylar), for example, but such a clad film is unable to resist the solder dip temperatures. Higher heat distortion substrates such as the polyimides have also been investigated but even these are not always satisfactory and in addition are quite expensive.

What is needed is a fast, continuous process for making laminates, especially thin flexible laminates, which is capable of producing laminates of uniform thickness with a smooth surface and with as few resin imperfections (cracks, pin holes, voids, etc.) as possible.

SUMMARY OF THE INVENTION

Accordingly the improved process of this invention overcomes the above problems and meets the above needs. The improvement resides in employing certain polymerizable resin/monomer mixtures to impregnate a reinforcing fibrous substrate, applying sufficient pressure across the lateral width of the impregnated substrate to express entrapped air bubbles therefrom and to more uniformly distribute the resin/monomer impregnant, and exposing the impregnated substrate in an inert atmosphere to a sufficient amount of ionizing radiation to polymerize the resin/monomer mixture.

The resin employed is devoid of any internal polymerizable unsaturated groups in the backbone of the resin and has two or more polymerizable groups of the formula

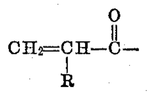

at the terminal portions of the resin, pendant from the resin backbone or combinations thereof, wherein R is hydrogen or methyl. The resin may be mixed with a non-volatile copolymerizable vinyl monomer having no aromatic groups directly attached to the vinyl group.

The benefits and advantages of the improved process of this invention will be apparent from the following description.

DESCRIPTION OF THE INVENTION

As indicated above attempts to make suitable laminates, especially flexible, thin electrical grade laminates, have not been entirely satisfactory. Among the various alternative resins investigated are the unsaturated polyester resins. U.S. 3,473,992 is typical of processes which have been developed purporting to make flexible clad laminates. But this process still retains some of the prior art disadvantages such as the need for extensive heating facilities to cure the resin, the need for multiple impregnation steps and the need for an adhesive on both the copper foil and laminate to get good bonding. Attempts have been made to replace thermal curing with other means as disclosed in U.S. 2,596,162 and U.S. 2,750,320. That this has not been satisfactory is attested to by U.S. 3,246,054 where ionizing radiation at a low dose was employed to partially polymerize the resin (which also contained a peroxide catalyst) followed by thermal cure. This process was an attempt to overcome the economically prohibitive amounts of irradiation required to cure a polyester resin.

Another disadvantage of polyesters is that multiple unsaturated groups are spaced along the backbone of the resin. Whether due to steric hinderance or for other reasons the resin is difficult to completely cure. Extensive post cure by thermal or irradiation means is usually required. One other disadvantage previously noted relates to copper clad laminates where the cure of unsaturated polyesters using peroxide type catalysts is inhibited by the presence of copper.

This invention overcomes these problems in that the particular resins employed cure rapidly and completely when exposed to ionizing radiation. By rapidly it is meant cure in seconds and generally in as short a time as a second or less. Cure is also obtained at economical dosages as low as 2 to 5 megarads or even less. The process does not use solvents and eliminates the need to evaporate, recover and recycle same. The process eliminates ovens and related apparatus which reduces plant space. The resin/monomer mixture does not contain a free radical catalyst and thus has an extended pot life which is not true of catalyzed polyesters and the like. The process eliminates the need for adhesives in preparing metal foil clad laminates.

The process is adaptable to precise control which results in beneficial property improvements in the laminates, such as uniformity, void free surface, dimensional stability, no pin holes, low moisture pick-up, good electrical properties and the ability to withstand solder dip temperatures.

The process may be illustrated by reference to the schematic drawing showing one embodiment of the invention wherein a flexible copper clad laminate is prepared. It is to be understood that the invention is not limited to the particular embodiment shown.

With reference to the drawing a fibrous substrate 10 is unwound from reel 11, passes over an idler roller 12, which can be adjusted by conventional means to regulate the tension on the substrate, and through a resin bath 13 where the substrate is impregnated with a resin/monomer mixture. The impregnated substrate 14 passes over a laminating roller 15. The resin bath and impregnated substrate is protected against stray radiation by a lead shield 16. Copper foil 17 is unwound from reel 18, passes around a stretch or tensioning roller 19 and passes over the laminating roller 15 and is positioned between the surface of the roller and the underside of the impregnated substrate 14. A polyester (Mylar) cover sheet 20 is unwound from reel 21, passes under a stretch or tensioning roller 22, and is brought into contact with the topside of the impregnated substrate 14 at the laminating roller 15. The cover sheet is employed to protect the surface of the impregnated substrate from oxygen inhibition and provides an inert barrier during the cure step.

At the laminating roller 15 a sandwich of copper foil/impregnated substrate/cover film is passed over the roller under tension. At the juncture point of the three components the tension which is applied exerts a pressure across the lateral width of the laminate against the drum and effectively expresses any entrapped air from the impregnated substrate and uniformly distributes the resin/monomer mixture. Located above the laminating roller 15 is a source of ionizing radiation 23 which bombards the compressed sandwich with high energy electrons and polymerizes the resin/monomer mixture. The laminate 24 coming off the laminating roller 15 is passed around guide rollers 25 to take-up reel 26 which provides the motive power for continuously pulling it through the process and also the tension or pressure needed at the laminating roller. For continuous operation it is desirable to provide the laminating roller with internal cooling means to obtain a constant temperature and remove the heat of polymerization.

The cover Mylar sheet may be stripped from the laminate before it is wound up on the take-up reel or it may be left and subsequently removed. If a flexible unclad laminate is desired the copper foil may be replaced by another Mylar film or eliminated completely. In the latter instance it is desirable to incorporate a small amount of a mold release agent in the resin bath to prevent sticking to the laminating roller. The Mylar may be replaced by another copper foil whereby a laminate with copper cladding on both sides is produced.

The process is also adaptable to preparing multi-ply laminates wherein more than one fibrous substrate is impregnated and brought into intimate contact with each other prior to or during the application of the pressure across the width of the substrate. It is contemplated by the invention that when more than one substrate is impregated that the resin baths may contain different resin/monomer compositions.

Both clad and unclad flexible laminates, usually of 5–15 mil thickness, are of use in preparing printed circuits. With copper clad laminates the desired electrical circuit is printed on the copper foil and by appropriate means the excess copper is etched away leaving only the copper circuit. This is perhaps the most common process used today. More efficient use of copper is possible, however, by using a flexible unclad laminate wherein the desired electrical circuit is printed on a side of the laminate and by appropriate means copper is electrodeposited on the circuit pattern. If a mold release agent was added to the resin/monomer bath it may be necessary to subject the laminate surface to a preliminary solvent wash to remove any of the mold release agent on the surface which might affect the adhesion of the deposited copper circuit to the laminate surface.

Flexible printed circuit laminates are increasingly employed in flexible circuitry for radios, televisions, stereo sets and the like; automotive dashboard wiring; flat cable; computer memory core components; flat capacitors; communication equipment; and a multitude of developing uses.

It is important to note that the cure of the laminate may be accomplished at room temperature in air without the need for an inert essentially oxygen free chamber since the top cover sheet (or foil) effectively provides same. The top cover sheet can be eliminated completely if the curing step is conducted in a chamber having an inert atmosphere such as nitrogen, helium or the like. Such techniques, sometimes called a *nitrogen box* are well known to the art. It can be seen that the process is readily adaptable to a variety of modes of operation employing different means of providing the inert atmosphere for the ionizing radiation cure step.

It is important and necessary to the quality of the laminate produced (uniformity, free of imperfections, smooth surface, etc.) that a lateral pressure be applied across the width of the laminate to express any entrapped air therefrom, to uniformly distribute the resin/monomer mixture across the width of the impregnated substrate and to compact or compress together the various combinations of substrates, foils and films. Various other means than employing tension on the laminate across the laminating roller may be employed. For example, the impregnated substrate may be passed through a pair of squeeze rollers to effectively apply this lateral (transverse) pressure or the squeeze rollers may be located at a further point in the process to apply the pressure across the width of the sandwich (composite) structure including the foil and/or cover sheets. Other means will be readily apparent from the above disclosure to those skilled in the art.

The process is adaptable to a variety of fibrous substrates. Glass fiber webs, fabrics, mats, etc. are widely used for such purposes. However, synthetic fabrics of nylon, polyesters, acrylics, and the like as well as cellulose substrates may also be used. Most any fibrous substrate, woven or nonwoven, may be used. Preferably nonwoven substrates are employed for better uniformity. Where flexibility is desired it is frequently preferred to use synthetic or cellulosic fibrous substrates since glass fibers under extreme repeated flex may break.

A variety of cover films and metal foils may be used such as polyester (Mylar), polyolefin and the like and copper, aluminum and silver foils. Polyester films and copper foils are preferred but many such materials may be used.

An important result of the process of this invention is the uniformity of the laminate both in the width and length thereof. It is possible to prepare a laminate, for example one of about 15 mil thickness, that will not vary by more than 1 mil or less, frequently 0.5 mil or less, in thickness throughout a production run. This uniformity also reflects itself in many of the electrical properties of the laminate.

Types of ionizing radiation include accelerated electrons and protons, gamma rays, X-rays and the like. Generally for industrial purposes accelerated electrons and radioactive isotopes such as cobalt 60 are generally employed. Of the two, accelerated electrons are preferred because of their lower cost per radiation dose. A variety of electron accelerators are commercially available such as the familiar Van de Graaff accelerator. Other types of accelerators include resonont transformers (G.E.), Dynamitrons (Radiation Dynamics), insulated core transformers (High Voltage Engineering), microwave linear accelerators (Varian Associates) and the like. Said accelerators can be employed at various voltages to vary the depth of penetration and at various beam intensities to vary the dosage rate, usually expressed in megarads. As indicated the curing step may be employed in a chamber having an inert atmosphere (eliminating the laminating roller, for example, provided other means are used to provided the transverse pressure), or when foil or a cover film are used as shown in the drawing, the inert atmosphere chamber may be eliminated. The amount or dose of radiation in megarads may range from about 1 up to about 8 to 10 megarads, but usually complete cure can be obtained with about 2 to 5 megarads.

The polymerizable resin essential to this process is devoid of any internal polymerizable groups in the backbone of the resin and has a plurality (two or more) of groups of the formula

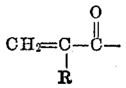

located at the terminal portions of the resin, pendant from the backbone of the resin or various combinations of terminal and pendant groups.

Useful resins according to the above description may be prepared by reacting about equivalent amounts of an unsaturated monocarboxylic acid, such as acrylic and methacrylic acid, with a polyepoxide. A variety of polyepoxides may be used, especially the polyglycidyl ethers of polyhydric phenols and polyhydric alcohols. Included within such resins are the epoxy novolac resins. Bisphenol A is a common and preferred polyhydric phenol. Such resins are fully described in U.S. 3,367,992, U.S. 3,506,-736, U.S. 3,179,623, U.S. 3,246,226 and U.S. 3,377,406 among others. The hydroxyl group formed by the interaction of the epoxide and acid group may be further reacted with dicarboxylic acid anhydrides (U.S. 3,586,-526), a saturated acyl halide (U.S. 3,556,529) or a polyisocyanate (U.S. 3,373,221). Similar resins are prepared by reacting a monoepoxide with acrylic or methacrylic acid followed by reaction of the hydroxyl group formed with a vinyl acyl halide to produce a divinyl compound (U.S. 3,586,528).

U.S. 3,560,237 describes another group of polymerizable resins prepared by reacting the hydroxyl group of hydroxyalkyl acrylates and methacrylates with various polyfunctional materials such as dibasic acids( or the chlorides) and polyisocyanates. For example, 0.6 mole of 2-hydroxyethyl acrylate was reacted with 0.3 mole of adipoyl chloride and in another case a prepolymer was made by reacting 20 parts of polypropylene glycol with 14.2 parts of toluene diisocyanate and then the isocyanate groups of the prepolymer were reacted with the hydroxyl groups of 12.4 parts of 2-hydroxyethyl acrylate.

Yet another useful group of resins may be prepared by first polymerizing a monomer such as glycidyl methacrylate alone or in mixture with other copolymerizable monomers and thereafter reacting the glycidyl groups with acrylic or methacrylic acids. The resulting resin contains a plurality of unsaturated groups pendant from the polymer backbone (see U.S. 3,530,100 for further details).

Many of the resins which may be used are liquids or may readily be liquified by heating and may be used without any copolymerizable monomer. However, from the standpoint of economics and for purposes of varying the properties of the finished laminate it is preferred to mix the resin with up to about 60 weight percent of a nonvolatile, copolymerizable vinyl monomer. The most useful mixtures generally comprise from about 40 to 70 weight percent of resin and about 60 to 30 weight percent of said monomer. Depending on the choice of monomers and resins the laminates may vary from very flexible to very rigid.

Most any nonvolatile, copolymerizable monomer may be used provided that the monomer is devoid of any aromatic group directly attached to the vinyl group such as styrene, vinyl toluene, and the like. It is apparent by the nature of the process that monomers which would rapidly evaporate from the impregnated substrate are not useful, although small losses of monomer can be tolerated since the process may be operated at room temperature and it is possible to operate the process with only a short period of time between the impregnation step and the curing step. Additionally sandwiching the impregnated substrate between cover films or foil also minimizes any evaporative losses.

Useful monomers include the alkyl acrylate and methacrylate esters, vinyl alkylethers, vinyl esters, vinyl nitriles, vinyl amides, and the like. In particular the alkyl and hydroxyalkyl acrylates are especially useful since they are quite sensitive to polymerization by ionizing radiation. Polyvinyl monomers such as ethylene glycol diacrylate and the like may also be used when more rigid laminates are desired. Typical monomers include methyl, ethyl, propyl, butyl, cyclohexyl, dodecyl and like alkyl esters of acrylic and methacrylic acid; hydroxyethyl, hydroxypropyl, hydroxybutyl and like hydroxyalkyl esters of acrylic and methacrylic acid; vinyl acetate, vinyl propionate and the like; and acrylonitrile. Other monomers will be readily apparent to the skilled worker.

Monomers useful in preparing flexible laminates include those having an alkyl group or a hydroxyalkyl group of at least about 2 carbons and preferably at least about 4 carbons. The number of carbons may range up to twelve and even higher. Alkyl acrylates and methacrylates and hydroxyalkyl acrylates and methacrylates are advantageously used for this purpose. Especially useful are the alkyl and hydroxyalkyl acrylates such as n-butyl acrylate, hydroxypropyl acrylate and the like. The above is not intended to be exhaustive but is intended to illustrate the many types of known monomers which may be used, a large number of which are commercially available.

To further illustrate the invention the following nonlimiting examples are presented. Unless otherwise specified all parts and percentages are by weight.

In each of the following examples, the radiation dosage was determined by observing the light absorption variation of an ionization sensitive blue cellophane film and comparing with standard curves obtained by a Faraday Well.

EXAMPLE 1

A polymerizable resin was prepared by reacting equivalent amounts of acrylic acid with a polyglycidyl ether of bisphenol A having an epoxide equivalent weight (EEW) of about 360. The resin was then mixed with n-butyl acrylate (50%) and it had a room temperature viscosity of 120 cps.

A copper clad flexible laminate was prepared using a process similar to that shown in the drawing. The substrate was a one-foot wide No. 108 Fiberglas cloth having resin bonded edges. The copper foil was a one-foot wide 1 oz. copper foil. A tension of no more than 2 lbs. was applied to all the tension rollers. A Mylar polyester cover sheet was employed.

The resin bath was filled with the above resin. Lead sheet shielding (¼ inch) was used as indicated in the drawing. The electron beam was produced by a 1 m.e.v. General Electric machine of the resonant core transformer type and was adjusted to give a 5 megarad dose. The process was operated at a rate of 2 ft./min. The laminating roller was internally cooled to remove heat of polymerization.

Laminate properties are summarized in Table I and Table II.

TABLE I.—LAMINATE PHYSICAL PROPERTIES

| Example number | Percent resin | Thickness, mils | Solder dip resist., 525° F. | Adhesion, 180° bond strength, lbs./in.-width |
|---|---|---|---|---|
| 1 | 75 | 6.2 | No degradation or delamination, 1 min. | 5 |
| 2 | 82 | 7.5 | do | 7 |
| 3 | 85 | 12.0 | do | 6 |
| 4 | 89 | 14.2 | do | 7 |

TABLE II.—LAMINATE ELECTRICAL PROPERTIES

| Example number | Surface resistivity, ohms/cm.² | Dielectric constant | Dissipation factor at 1 mHz. | Arc resistance, sec. | Water resistance 24 hrs., percent pick-up |
|---|---|---|---|---|---|
| 1 | $3.0\times10^{11}$ | 2.08 | 0.0031 | 120 | 0.2 |
| 2 | $2.3\times10^{11}$ | 2.19 | 0.0035 | 126 | 0.1 |
| 3 | $7.5\times10^{12}$ | 2.33 | 0.0041 | 75 | 0.4 |
| 4 | $2.5\times10^{11}$ | 2.16 | 0.0013 | 85 | 0.4 |

Unclad flexible laminates are readily prepared according to the above examples merely by replacing the copper foil with another polyester film. All the laminates prepared had good dimensional stability and uniformity throughout the test runs. Laminates having similar properties may be obtained when the process is operated at speeds up to 15 ft./min. and when the dosage is varied from as low as 1 megarad up to 5 megarads or higher.

EXAMPLE 2

The previous example was repeated except that the following resin was used: about equivalent amounts of acrylic acid was reacted with a polyglycidyl ether of bisphenol A having an EEW of about 520. The resin was mixed with n-butyl acrylate as before.

EXAMPLE 3

Example 2 was repeated except that the fiberglass was replaced with a 1.5 oz. non-woven polyester cloth (No. 2014 Remay).

EXAMPLE 4

Example 1 was repeated except that the fiberglass was replaced with the nonwoven polyester cloth of Example 3.

EXAMPLE 5

Similar to Example 1 an unclad laminate was prepared by replacing the bottom copper foil with a Mylar film wherein the average dosage applied was 4.5 megarads and the process was operated at 5 ft./min. The 14 inch wide beam window was set at three inches from the laminating roller. Lower dosages of 1.5–2.0 megarads were shown to be effective but in these runs the higher dose level was employed.

Resin A was prepared by reacting acrylic acid with a bisphenol based polyepoxide having an EEW of 510. The resin was mixed with n-butyl acrylate (50%) and had a viscosity of 164 cs. (77° F.).

Resin B was prepared by reacting acrylic acid with an epoxy novolac having an EEW of 175–182 and mixed with n-butyl acrylate (50%). The viscosity at 79° F. was 120 cs.

The room temperature viscosity of the resultant mixture was 140 cs. One run making 255 feet of laminate was made using Fiberglas 108 as the substrate and a mixture of 10% Resin B and 90% Resin A to impregnate it. The resulting laminate had a thickness which ranged from 10.8 to 12.1 mils and had good dimensional stability and electrical properties.

A second run making 500 feet of laminate was made with the same resin mixture as above but using a nonwoven polyester substrate, the laminate had a thickness of 10.5 to 11.4 mils and properties similar to the previous run.

A third run making 300 feet of laminate was made using the nonwoven polyester substrate but the bottom Mylar cover film was omitted. The same resin mixture as before was used except that 0.5% by weight of a mold release agent (Zelec UN) was added. A thinner laminate of 8.0 to 8.5 mils was produced with excellent uniformity.

A fourth run was made as in the third run except that a copper clad laminate was prepared by replacing the Mylar film with a 1 oz. copper foil. The laminate had a thickness of 12.5 to 15.0 mils.

In any of the previous examples the acrylic acid may be replaced by an equivalent amount of methacrylic acid. In addition the n-butyl acrylate may be replaced by other monomers such as hydroxyethyl acrylate, hydroxybutyl acrylate and the like.

EXAMPLE 6

Similar to Example 1 an unclad laminate was prepared eliminating the copper foil and employing a release agent in the resin bath mixture. The average dosage applied was 4.5 megarads.

Resin A was prepared by reacting stoichiometric quantities of a polyglycidyl ether of tetrabromobisphenol A having an EEW of 650 with acrylic acid. The resin was mixed with 50% by weight of n-butylacrylate.

Resin B was prepared by reacting stoichiometric quantities of dibromophenyl glycidyl ether with acrylic acid.

A 100 foot laminate was prepared employing a resin comprised of 60% by weight of Resin A and 40% by weight of Resin B. This mixture contained 22% bromine by weight and had a 77° F. viscosity of 146 cs. The mixture was then mixed with 0.5% Zelac UN release agent. The 12 mil laminate exhibited an SE rating of 24.3% LOI (limited oxygen index) by ASTM 2863–70.

EXAMPLE 7

A resin was prepared by reacting stoichiometric quantities of a polyglycidyl ether of bisphenol A having an EEW of 360 and acrylic acid. The resin was mixed with 60% by weight 2-hydroxypropyl acrylate. This mixture was then blended with 0.5% Zelac UN release agent.

A 50 foot unclad laminate was prepared at a dosage of 2 megarads employing Fiberglas 108 cloth with a Volan A finish and a top sheet of Mylar. The release agent prevents the underside of the laminate from adhering to the laminating roller.

The resultant 15 mil semi-rigid laminate was not affected by a 10-minute exposure by submersion in acetone, water or 1,1,1-trichloroethane.

EXAMPLE 8

A 7-ply multilayer 8 in. x 8 in. laminate was prepared by a hand lay-up technique employing the resin mixture of Example 5 and Fiberglas 181 cloth with a Volan A finish. The laminate was placed between two Mylar sheets and cured at a dosage of 5 megarads. The 50 mil rigid laminate has the following properties.

| | | |
|---|---|---|
| Barcol hardness | | 50 |
| Flexural strength | p.s.i. | 20,000 |
| Dielectric constant at 1 mHz. | | 2.71 |
| Dissipation factor at 1 mHz. | | 0.0120 |
| Arc resistance | sec. | 125 |

Various modifications and mechanical variations may be made without departing from the scope of the invention. Certain materials may be added to the resin/monomer mixture such as mold release agents, inert fillers, antioxidants and the like. It is further contemplated by the invention to prepare flame retardant laminates either by the addition of maerials having phosphorous, chlorine and/or bromine and the like or by the selection of various reactants used to prepare the resins. For example, tetrabromo bisphenol A may be used to prepare polyepoxide resins which may be used to prepare resins as described and shown herein.

What is claimed is:

1. A continuous process for preparing reinforced resin laminates of uniform thickness comprising the steps of (a) impregnating a fibrous substrate with a mixture of about 40 to 100 weight percent of a polymerizable resin and 0 to about 60 weight percent of a non-volatile copolymerizable vinyl monomer having no aromatic groups directly attached to the vinyl group, (b) applying sufficient pressure across the lateral width of the impregnated substrate to express entrapped air bubbles therefrom, and (c) exposing the impregnated substrate in an inert atmosphere to a sufficient amount of ionizing radiation to polymerize said resin/monomer mixture, said resin devoid of any internal polymerizable unsaturated groups in the backbone of the resin and having two or more polymerizable groups of the formula $$CH_2{=}\underset{\displaystyle R}{\underset{|}{C}}-\overset{\displaystyle O}{\overset{\|}{C}}$$

at the terminal portion of the resin, pendant from the resin backbone or combinations thereof, wherein R is hydrogen or methyl.

2. A process according to claim 1 wherein prior to or during step (b) a plurality of impregnated substrates are brought into contact with each other.

3. A process according to claim 1 wherein prior to or during step (b) a sheet of metal foil is brought into contact with at least one side of the impregnated substrate.

4. A process according to claim 3 wherein said foil is copper foil.

5. A process according to claim 1 wherein prior to or during step (b) a film is brought into contact with at least one side of the impregnated substrate.

6. A process according to claim 5 wherein said film is a polyester film.

7. A process according to claim 5 further comprising the steps of stripping said film from the laminate.

8. A process according to claim 1 wherein said mixture contains about 40 to 70 weight percent of said resin and about 60 to 30 weight percent of said monomer.

6. A process according to claim 5 wherein said film is claim 3.

10. A laminate produced according to the process of claim 4.

11. A continuous process for producing flexible electrical grade reinforced resin laminates of uniform thickness comprising the steps of (a) impregnating a fibrous substrate with a mixture of about 40 to 70 weight percent of a polymerizable resin and about 60 to 30 weight percent of a monomer selected from the group consisting of alkyl acrylate and methacrylate esters, hydroxyalkyl acrylate and methacrylate esters and mixtures thereof wherein said alkyl group in each instance has at least two carbon atoms, (b) applying sufficient pressure across the lateral width of the impregnated substrate to express entrapped air bubbles therefrom, and (c) exposing the impregnated substrate in an inert atmosphere to a sufficient amount of ionizing radiation to polymerize said resin/monomer mixture, said resin devoid of any internal polymerizable unsaturated groups in the backbone of the resin and having two or more polymerizable groups of the formula $$CH_2{=}\underset{\displaystyle R}{\underset{|}{C}}-\overset{\displaystyle O}{\overset{\|}{C}}-$$

at the terminal portion of the resin, pendant from the resin backbone or combinations thereof, wherein R is hydrogen or methyl.

12. A process according to claim 11 wherein said monomer alkyl groups have at least 4 carbon atoms.

13. A process according to claim 12 wherein said alkyl groups have 4 to about 12 carbon atoms.

14. A process according to claim 13 wherein said monomer is an alkyl or hydroxyalkyl acrylate.

15. A process according to claim 12 wherein said monomer is an alkyl or hydroxyalkyl acrylate.

16. A process according to claim 11 wherein said resin is prepared by reacting about equivalent amounts of an unsaturated monocarboxylic acid with a polyepoxide resin.

17. A process according to claim 16 wherein said acid is acrylic or methacrylic acid.

18. A process according to claim 17 wherein said polyepoxide has an epoxide equivalent weight of about 300 to 600.

19. A process according to claim 11 wherein prior to or during step (b) a plurality of impregnated substrates are brought into contact with each other.

20. A process according to claim 11 wherein prior to or during step (b) a sheet of metal foil is brought into contact with at least one side of the impregnated substrate.

21. A process according to claim 20 wherein said foil is copper foil.

22. A process according to claim 11 wherein prior to or during step (b) a film is brought into contact with at least one side of the impregnated substrate.

23. A process according to claim 22 further comprising the steps of stripping said film from the laminate.

24. A laminate produced according to the process of claim 20.

25. A laminate according to claim 24 wherein said foil is copper foil.

26. A laminate produced according to the process of claim 21.

References Cited

UNITED STATES PATENTS

| | | | |
|---|---|---|---|
| 3,265,527 | 8/1966 | Adelman | 117—93.31 X |
| 3,437,514 | 8/1969 | Burlant | 117—93.31 |
| 3,556,928 | 1/1971 | Zolog | 156—330 X |
| 3,717,543 | 2/1973 | Sinclair et al. | 156—330 X |
| 3,721,597 | 3/1973 | Colburn | 156—332 X |

EDWARD G. WHITBY, Primary Examiner

U.S. Cl. X.R.

117—93.31; 156—247, 272, 330, 332; 161—196